United States Patent
Liao

(10) Patent No.: US 10,291,882 B2
(45) Date of Patent: May 14, 2019

(54) CALL PROCESSING METHOD AND GATEWAY

(71) Applicant: Huawei Technologies Co., Ltd., Shenzhen (CN)

(72) Inventor: Shuzhao Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 14/984,481

(22) Filed: Dec. 30, 2015

(65) Prior Publication Data

US 2016/0119584 A1    Apr. 28, 2016

Related U.S. Application Data

(63) Continuation of application No. PCT/CN2014/072287, filed on Feb. 20, 2014.

(30) Foreign Application Priority Data

Jul. 3, 2013    (CN) .......................... 2013 1 0277289

(51) Int. Cl.
   *H04N 7/15*    (2006.01)

(52) U.S. Cl.
   CPC .............. *H04N 7/152* (2013.01); *H04N 7/15* (2013.01)

(58) Field of Classification Search
   CPC ..................................................... H04N 7/152
   USPC ........................................................ 709/204
   See application file for complete search history.

(56) References Cited

U.S. PATENT DOCUMENTS

| 6,470,020 B1* | 10/2002 | Barker | H04L 29/06 370/352 |
| 6,654,366 B1* | 11/2003 | Ketcham | H04L 12/66 370/352 |
| 7,239,629 B1* | 7/2007 | Olshansky | H04Q 3/0045 370/353 |

(Continued)

FOREIGN PATENT DOCUMENTS

| CN | 1464750 A | 12/2003 |
| CN | 1567896 A * | 1/2005 |

(Continued)

OTHER PUBLICATIONS

Wu et al., "Remote presenting method, terminal and system", CN 102868873 A, pp. 1-20, 2011.*

(Continued)

*Primary Examiner* — Ondrej C Vostal
(74) *Attorney, Agent, or Firm* — Conley Rose, P.C.

(57) ABSTRACT

A call processing method and a gateway are disclosed, where the gateway is configured to process a call between a multipoint control unit (MCU) and a terminal device. The method includes receiving, by the gateway, a call initiated by the terminal device; negotiating, by the gateway, with the terminal device, to establish a first call between the gateway and the terminal device and determine a media type of the first call; and adding the negotiated media type of the first call to a call established between the gateway and the MCU, where the media type of the first call is different from that of the established call. In this way, the negotiated media type of the call is added to the call established between the gateway and the MCU.

20 Claims, 6 Drawing Sheets

(56) References Cited

U.S. PATENT DOCUMENTS

| | | | | |
|---|---|---|---|---|
| 7,617,319 | B2* | 11/2009 | Burks | H04L 29/06027 709/203 |
| 7,653,013 | B1 | 1/2010 | Moran | |
| 7,688,764 | B2* | 3/2010 | Dorenbosch | H04L 29/06 370/260 |
| 7,840,681 | B2* | 11/2010 | Acharya | G06Q 10/10 709/204 |
| 7,983,244 | B2* | 7/2011 | Rasanen | H04L 65/103 370/352 |
| 7,995,560 | B2* | 8/2011 | Kucmerowski | H04M 3/42229 370/351 |
| 8,457,109 | B2* | 6/2013 | Thalanany | H04L 63/10 370/352 |
| 2002/0133600 | A1* | 9/2002 | Williams | H04L 29/06 709/228 |
| 2003/0229699 | A1* | 12/2003 | Moran | H04L 29/06 709/227 |
| 2003/0235184 | A1* | 12/2003 | Dorenbosch | H04L 29/06 370/352 |
| 2005/0141484 | A1* | 6/2005 | Rasanen | H04L 65/103 370/352 |
| 2006/0251044 | A1* | 11/2006 | Haddad | H04L 63/0823 370/349 |
| 2006/0291448 | A1* | 12/2006 | Hellgren | H04L 63/08 370/352 |
| 2007/0047709 | A1* | 3/2007 | Brunson | H04M 3/42391 379/142.01 |
| 2007/0133440 | A1* | 6/2007 | Bouat | H04L 29/06027 370/282 |
| 2007/0189279 | A1* | 8/2007 | Thalanany | H04L 12/66 370/356 |
| 2007/0291106 | A1* | 12/2007 | Kenrick | H04M 3/42017 348/14.01 |
| 2007/0297339 | A1* | 12/2007 | Taylor | H04L 29/06027 370/248 |
| 2008/0130845 | A1* | 6/2008 | Bose | H04L 65/605 379/93.07 |
| 2008/0259909 | A1* | 10/2008 | Runeson | H04L 65/1006 370/352 |
| 2008/0311903 | A1* | 12/2008 | Levin | H04L 65/1006 455/426.1 |
| 2008/0318610 | A1 | 12/2008 | Bhaskaran et al. | |
| 2009/0006533 | A1* | 1/2009 | Guo | H04L 65/1046 709/203 |
| 2009/0013078 | A1* | 1/2009 | Bencheikh | H04L 65/80 709/227 |
| 2009/0083426 | A1* | 3/2009 | Cagenius | H04L 29/125 709/227 |
| 2009/0147754 | A1* | 6/2009 | Long | H04M 7/123 370/331 |
| 2009/0252149 | A1* | 10/2009 | Zhu | H04M 7/1255 370/352 |
| 2010/0241686 | A1* | 9/2010 | Deng | H04L 65/1069 709/202 |
| 2011/0026453 | A1* | 2/2011 | Yan | H04W 8/082 370/328 |
| 2011/0164613 | A1* | 7/2011 | Xie | H04L 65/1016 370/352 |
| 2012/0263286 | A1* | 10/2012 | Liao | H04L 12/1818 379/202.01 |
| 2013/0054762 | A1* | 2/2013 | Asveren | H04L 61/2553 709/220 |
| 2013/0094671 | A1* | 4/2013 | Zhou | H04L 12/1818 381/119 |
| 2014/0146129 | A1* | 5/2014 | Ye | H04N 7/147 348/14.09 |
| 2015/0002614 | A1* | 1/2015 | Zino | H04N 7/148 348/14.08 |

FOREIGN PATENT DOCUMENTS

| | | | | |
|---|---|---|---|---|
| CN | 1592341 | A | | 3/2005 |
| CN | 1984309 | A | | 6/2007 |
| CN | 101098449 | A | | 1/2008 |
| CN | 101102456 | A | | 1/2008 |
| CN | 101127620 | A | * | 2/2008 |
| CN | 101127620 | A | | 2/2008 |
| CN | 102523099 | A | | 6/2012 |
| CN | 101442566 | B | * | 7/2012 |
| CN | 102868873 | A | * | 1/2013 ............ H04N 7/147 |
| CN | 102868873 | A | | 1/2013 |
| CN | 103369292 | A | | 10/2013 |

OTHER PUBLICATIONS

Yongdong et al., "A method and system for transmitting logical channel numbers in a session initiation protocol", CN 101127620 A, pp. 1-13, 2007.*

Camarillo et al., "Grouping of Media Lines in the Session Description Protocol (SDP)", RFC3388, 2002.*

Zino et al., "Video session manager and method for enabling and managing video calling and telepresence communications sessions across multiple domains", US Pub 2015002614 A1, Google, provisional filed 2012.*

Perkins, C., et al., "RTP Requirements for RTC-Web," draft-perkins-rtcweb-rtp-usage-02, Jul. 11, 2011, 38 pages.

Foreign Communication From a Counterpart Application, European Application No. 14819703.1, Extended European Search Report dated Jun. 8, 2016, 8 pages.

"Series H: Audiovisual and Multimedia Systems, Infrastructure of audiovisual services—Transmission multiplexing and synchronization, Frame structure for a 64 to 1920 kbit/s channel in audiovisual teleservices," ITU-T, H.221, Mar. 2009, 58 pages.

"Series H: Audiovisual and Multimedia Systems, Infrastructure of audiovisual services—Communication procedures, System for establishing communication between audiovisual terminals using digital channels up to 2 Mbit/s," ITU-T, H.242, Mar. 2009, 100 pages.

"Series H: Audiovisual and Multimedia Systems, Infrastructure of audiovisual services—Communication procedures, Procedures for establishing communication between three or more audiovisual terminals using digital channels up to 1920 kbit/s," ITU-T, H.243, Oct. 2005, 64 pages.

"Series H: Audiovisual and Multimedia Systems, Infrastructure of audiovisual services—Systems and terminal equipment for audiovisual services, Packet-based multimedia communications systems, Amendment 1: Use of Facility message to enable call transfer," ITU-T, H.323, Amendment 1, Mar. 2013, 8 pages.

"Series T: Terminals for Telematic Services, Data protocols for multimedia conferencing," ITU-T, T.120, Jan. 2007, 46 pages.

Partial English Translation and Abstract of Chinese Patent Application No. CN101127620, Dec. 21, 2015, 6 pages.

Partial English Translation and Abstract of Chinese Patent Application No. CN103369292, Dec. 21, 2015, 3 pages.

Foreign Communication From a Counterpart Application, Chinese Application No. 201310277289.7, Chinese Office Action dated Dec. 14, 2015, 6 pages.

Foreign Communication From a Counterpart Application, PCT Application No. PCT/CN2014/072287, English Translation of International Search Report dated Jun. 10, 2014, 2 pages.

Foreign Communication From a Counterpart Application, PCT Application No. PCT/CN2014/072287, English Translation of Written Opinion dated Jun. 10, 2014, 7 pages.

"Series H: Audiovisual and Multimedia Systems, Infrastructure of audiovisual services—Systems and terminal equipment for audiovisual services, Narrow-band visual telephone systems and terminal equipment, Telecommunication Standardization Sector of ITU," ITU-T H.320, Mar. 2004, 34 pages.

Foreign Communication From a Counterpart Application, European Application No. 14819703.1, European Office Action dated Nov. 16, 2018, 7 pages.

* cited by examiner

CALL PROCESSING METHOD AND GATEWAY

CROSS-REFERENCE TO RELATED APPLICATIONS

This application is a continuation of International Application No. PCT/CN2014/072287, filed on Feb. 20, 2014, which claims priority to Chinese Patent Application No. 201310277289.7, filed on Jul. 3, 2013, both of which are hereby incorporated by reference in their entireties.

TECHNICAL FIELD

The present disclosure relates to the field of communications technologies, and in particular, to a call processing method and a gateway.

BACKGROUND

A videoconferencing service is a multimedia service that integrates information such as voice, an image, and data for long-distance transmission. A service provided by the videoconferencing service is video conferencing, which may include three types of content: image, voice, and data. Video conferencing enables people to hear voice of an opposite party and see an image of the opposite party during remote communication, which enhances a sense of reality, a sense of intimacy, and a sense of presence during the communication. In addition, the videoconferencing service may be used in fields such as military, politics, economy, education, and health fields to fully exert its advantages of realness, high efficiency, and real-timeness to provide simple, convenient, and efficient means of communication, management, collaborative decision making, and the like.

A video conference service is a type of videoconferencing service, and is a communication manner in which a conference is held between two or more places by using a television technology and a device through a transmission channel. A video conference system in the prior art generally includes several parts, such as a terminal device and a multipoint control unit (MCU). The terminal device is generally directly operated by a user, and provides input and output of video, audio, and data signals and the like. The terminal device includes a video input and output device, an audio input and output device, a terminal processor, a terminal management system, and the like, and may be equipped with peripheral devices such as a sound console, a power amplifier, a screen, an electronic whiteboard according to service requirements of different users. Functions of the terminal device are to collect a live image signal, a voice signal, and a related data signal, perform compression coding and multiplexing, and then transfer the signals to a transmission channel, and to classify and decode received video conference signals to restore image, voice, and data signals for a receiving conference site. In addition, the terminal device also transmits a conference control signal of a conference to the MCU, and executes a control instruction of the MCU for the video conference system.

In the video conference system, the MCU is a control center of the video conference system. When a quantity of terminal devices participating in a conference exceeds two, the MCU must be used for control purpose, and all terminal devices need to connect to the MCU by using a standard interface. The MCU implements switching and mixing of an image and voice according to protocols such as international standards H.221, H.242, and H.243, and implement related functions such as control of all conference sites.

In the prior art, an MCU provides media switching of voice, video, and an auxiliary stream. A user can implement data communication of voice, video, and an auxiliary stream with the MCU by using a terminal device that supports voice, video, and an auxiliary stream. After terminal devices join a conference, users can hear voice of each other, see video images of each other, and see a slide shared by using an auxiliary stream. In addition, terminal devices in a video conference system can further implement data conference communication with a data conference server, where the data conference server is used to process a data service. Referring to FIG. 1, FIG. 1 is a structural diagram of a system that includes a video conference system and a data conference server in the prior art, where a web client and an Internet Protocol (IP) phone are terminal devices.

In the prior art, an MCU shares a slide in a manner of an auxiliary stream, and a data conference server shares a slide in a manner of sharing a data conference desktop. When both an MCU and a data conference server exist in a network, a gateway is required to support communication between an auxiliary stream on the MCU and a data conference on the data conference server. The gateway is used to complete signaling and media switching between the auxiliary stream and the data conference, so that a user who joins a video conference system by using an IP PHONE can see, in the manner of an auxiliary stream, a shared desktop of a user who joins a conference of the data conference server, and a user who joins the conference of the data conference server by using a web client can see, in the manner of sharing a data conference desktop, the auxiliary stream sent by the IP phone that joins the video conference system.

When a user accesses the MCU by using a terminal device that supports audio, video, and an auxiliary stream and the like, only one call is required between the terminal device and the MCU. However, if the user joins the video conference system by using multiple terminal devices, and each terminal device supports only one media type, the multiple terminal devices need to separately establish one call with the MCU. In this case, one user establishes multiple calls, and multiple ports of the MCU are occupied, which wastes port resources of the MCU.

SUMMARY

Embodiments of the present disclosure provide a call processing method and a gateway, where the gateway is configured to process a call between an MCU and a terminal device; and, after a call is established between the terminal device and the gateway and a media type of the call is determined through negotiation, the negotiated media type of the call is added to a call established between the gateway and the MCU. This can efficiently reduce a quantity of calls established by the MCU and save port resources of the MCU.

According to a first aspect, embodiments of the present disclosure provide a call processing method, including receiving, by a gateway, a call initiated by a terminal device; negotiating, by the gateway, with the terminal device, to establish a first call between the gateway and the terminal device and determine a media type of the first call; and adding the negotiated media type of the first call to a call established between the gateway and an MCU, where the media type of the first call is different from that of the established call.

With reference to the first aspect, in a first possible implementation manner of the first aspect, the adding the negotiated media type of the first call to a call established between the gateway and an MCU includes searching for a preset binding relationship between terminal devices and determining a set of terminal devices that have a binding relationship with the terminal device; and adding, according to the set of terminal devices, the negotiated media type of the first call to the call established between the gateway and the MCU.

With reference to the first possible implementation manner of the first aspect, in a second possible implementation manner of the first aspect, the adding, according to the set of terminal devices, the negotiated media type of the first call to the call established between the gateway and the MCU includes determining whether a second call that includes a negotiated media type of any terminal device in the set of terminal devices exists in the call established between the gateway and the MCU; and if the second call that includes a negotiated media type of any terminal device in the set of terminal devices exists in the call established between the gateway and the MCU, adding the negotiated media type of the first call to the second call.

With reference to the second possible implementation manner of the first aspect, in a third possible implementation manner of the first aspect, the adding, according to the set of terminal devices, the negotiated media type of the first call to the call established between the gateway and the MCU includes, if the second call that includes a negotiated media type of any terminal device in the set of terminal devices does not exist in the call established between the gateway and the MCU, initiating, by the gateway, a call to the MCU and establishing a third call between the gateway and the MCU, where a media type of the third call is the media type of the first call.

With reference to the first aspect, in a fourth possible implementation manner of the first aspect, the adding the negotiated media type of the first call to a call established between the gateway and an MCU includes determining whether at least one call that does not include a media type same as the media type of the first call exists in the call established between the gateway and the MCU; and selecting a fourth call from the at least one call according to a preset rule, and adding the negotiated media type of the first call to the fourth call.

With reference to the fourth possible implementation manner of the first aspect, in a fifth possible implementation manner of the first aspect, the method further includes, if a call that does not include the media type same as the media type of the first call does not exist in the call established between the gateway and the MCU, establishing a fifth call between the gateway and the MCU, where a media type of the fifth call is the media type of the first call.

According to a second aspect, embodiments of the present disclosure further provide a gateway, including a receiving module configured to receive a call initiated by a terminal device; a negotiating and establishing module configured to, after the receiving module receives the call, negotiate with the terminal device to establish a first call between the gateway and the terminal device and determine a media type of the first call; and an adding module configured to, after the negotiation establishing module establishes the first call and determines the media type of the first call, add the negotiated media type of the first call to a call established between the gateway and an MCU, where the media type of the first call is different from that of the established call.

With reference to the second aspect, in a first possible implementation manner of the second aspect, the adding module includes a searching and determining module configured to, after the negotiating and establishing module establishes the first call and determines the media type of the first call, search for a preset binding relationship between terminal devices and determine a set of terminal devices that have a binding relationship with the terminal device; and a first adding module configured to, after the searching and determining module determines the set of terminal devices, add, according to the set of terminal devices, the negotiated media type of the first call to the call established between the gateway and the MCU.

With reference to the first possible implementation manner of the second aspect, in a second possible implementation manner of the second aspect, the first adding module includes a determining module configured to determine whether a second call that includes a negotiated media type of any terminal device in the set of terminal devices exists in the call established between the gateway and the MCU; and a third adding module configured to, after the determining module determines that the second call that includes a negotiated media type of any terminal device in the set of terminal devices exists in the call established between the gateway and the MCU, add the negotiated media type of the first call to the second call.

With reference to the second possible implementation manner of the second aspect, in a third possible implementation manner of the second aspect, the first adding module further includes an establishing module configured to, if the second call that includes a negotiated media type of any terminal device in the set of terminal devices does not exist in the call established between the gateway and the MCU, initiate a call to the MCU and establish a third call between the gateway and the MCU, where a media type of the third call is the media type of the first call.

With reference to the second aspect, in a fourth possible implementation manner of the second aspect, the adding module includes a call determining module configured to, after the negotiating and establishing module establishes the first call and determines the media type of the first call, determine whether at least one call that does not include a media type same as the media type of the first call exists in the call established between the gateway and the MCU; and a selecting and adding module configured to, when the call determining module determines that the at least one call that does not include the media type same as the media type of the first call exists in the call established between the gateway and the MCU, select a fourth call from the at least one call according to a preset rule, and add the negotiated media type of the first call to the fourth call.

With reference to the fourth possible implementation manner of the second aspect, in a fifth possible implementation manner of the second aspect, the adding module further includes a call establishing module configured to, if a call that does not include the media type same as the media type of the first call does not exist in the call established between the gateway and the MCU, establish a fifth call between the gateway and the MCU, where a media type of the fifth call is the media type of the first call.

It can be seen from the foregoing technical solutions that the embodiments of the present disclosure have the following advantages.

After receiving a call initiated by a terminal device, a gateway negotiates with the terminal device to establish a first call between the gateway and the terminal device and determine a media type of the first call, and adds the negotiated media type of the first call to a call established between the gateway and an MCU, such that multiple calls between the gateway and the terminal device can be combined into one call between the gateway and the MCU, which efficiently reduces a quantity of ports occupied by calls established by the MCU and saves port resources of the MCU.

DESCRIPTION OF EMBODIMENTS

Embodiments of the present disclosure provide a call processing method and a gateway, where the gateway is configured to process a call between an MCU and a terminal device. After a call is established between the terminal device and the gateway and a media type of the call is determined by means of negotiation, the negotiated media type of the call is added to a call established between the gateway and the MCU. This can efficiently reduce a quantity of calls established by the MCU and save port resources of the MCU.

Figure 1:
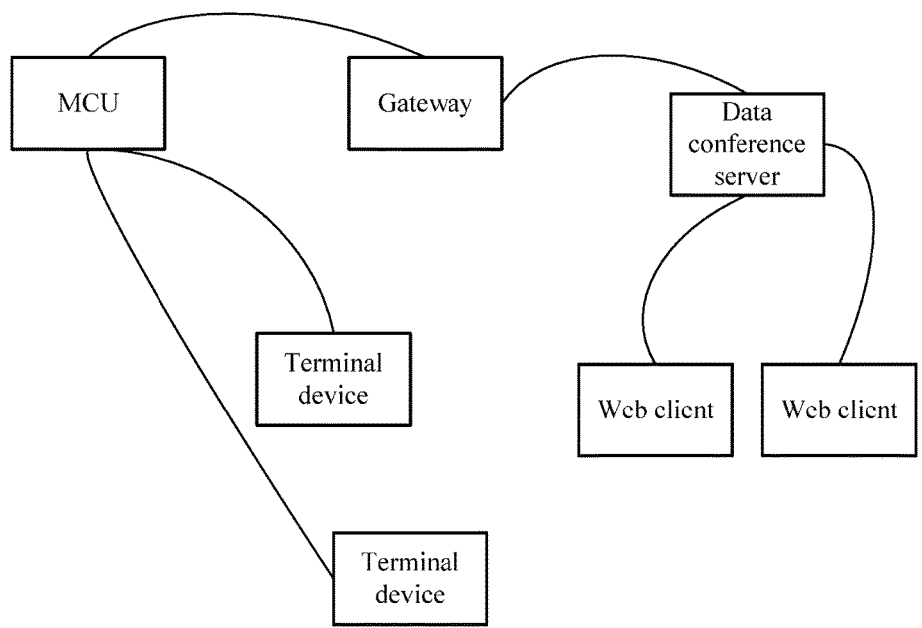
FIG. 1 is a structural diagram of a system that includes a video conference system and a data conference server in the prior art.
Figure 2:
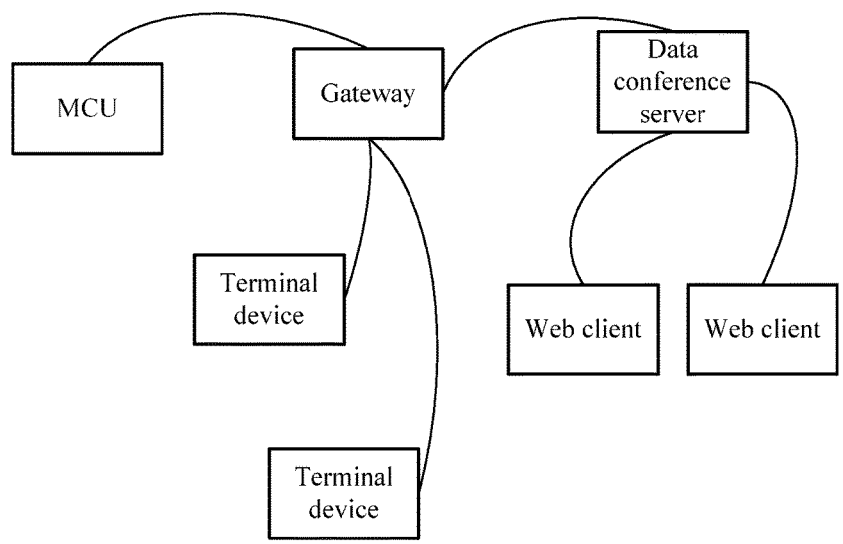
FIG. 2 is a structural diagram of a system that includes a video conference system and a data conference server according to an embodiment of the present disclosure.

Referring to FIG. 2, FIG. 2 is a structural diagram of a system that includes a video conference system and a data conference server according to an embodiment of the present disclosure, where an MCU and a terminal device constitute the video conference system. Compared with the prior art shown in FIG. 1, this embodiment of the present disclosure characterizes in that a terminal device accesses an MCU via a gateway, the terminal device can initiate a call to the gateway, and the gateway processes a call between the MCU and the terminal device, where the terminal device may be a videoconferencing terminal, or may be an IP phone, or may be a web client.

It should be noted that, in this embodiment of the present disclosure, the gateway and the MCU may be devices that are mutually independent, or the MCU is an MCU with a function of a gateway.

Figure 3:
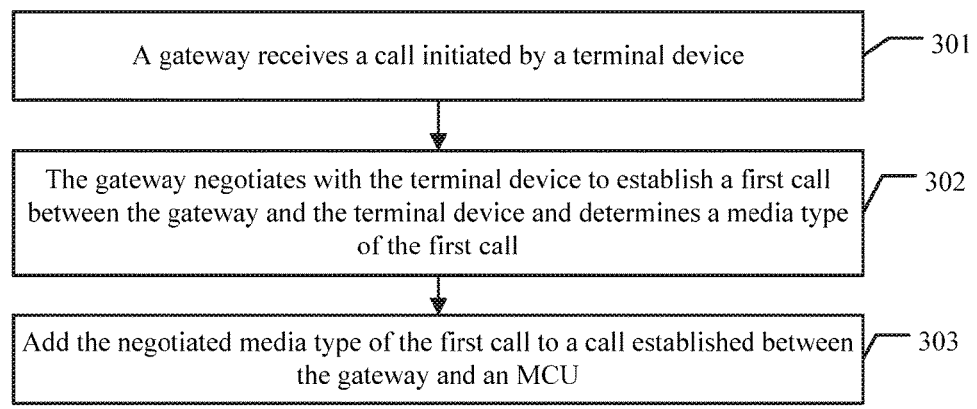
FIG. 3 is a schematic diagram of a call processing method according to an embodiment of the present disclosure.

The following describes a method for a gateway to process a call initiated by a terminal device. Referring to FIG. 3, FIG. 3 is an embodiment of a call processing method in the embodiment of the present disclosure, and the method includes the following steps.

301. A gateway receives a call initiated by a terminal device.

In this embodiment of the present disclosure, after a conference is held using an MCU in a video conference system, a user can join the conference disclosure using the terminal device. More specifically, the user can initiate a call using the terminal device, and the gateway can receive the call initiated by the terminal device. In an implementation manner, the conference supports at least two types of the following three media types: audio, video, and auxiliary stream. It should be noted that this embodiment of the present disclosure is applicable to multiple media types, but is not limited to the foregoing three media types.

302. The gateway negotiates with the terminal device to establish a first call between the gateway and the terminal device and determines a media type of the first call.

In this embodiment of the present disclosure, after receiving the call initiated by the terminal device, the gateway negotiates with the terminal device, establishes the first call between the gateway and the terminal device and determines the media type of the first call, where the media type may be audio, video, auxiliary stream, or the like.

303. Add the negotiated media type of the first call to a call established between the gateway and an MCU, where the media type of the first call is different from that of the established call.

In this embodiment of the present disclosure, after determining the media type of the first call, the gateway adds the negotiated media type of the first call to the call established between the gateway and the MCU.

In this embodiment of the present disclosure, after receiving a call initiated by a terminal device, a gateway may negotiate with the terminal device to establish a first call between the gateway and the terminal device and determine a media type of the first call, and add the negotiated media type of the first call to a call established between the gateway and an MCU, such that multiple calls between the gateway and the terminal device can be combined into one call between the gateway and the MCU, which efficiently reduces a quantity of used ports on the MCU and saves port resources of the MCU.

Figure 4:
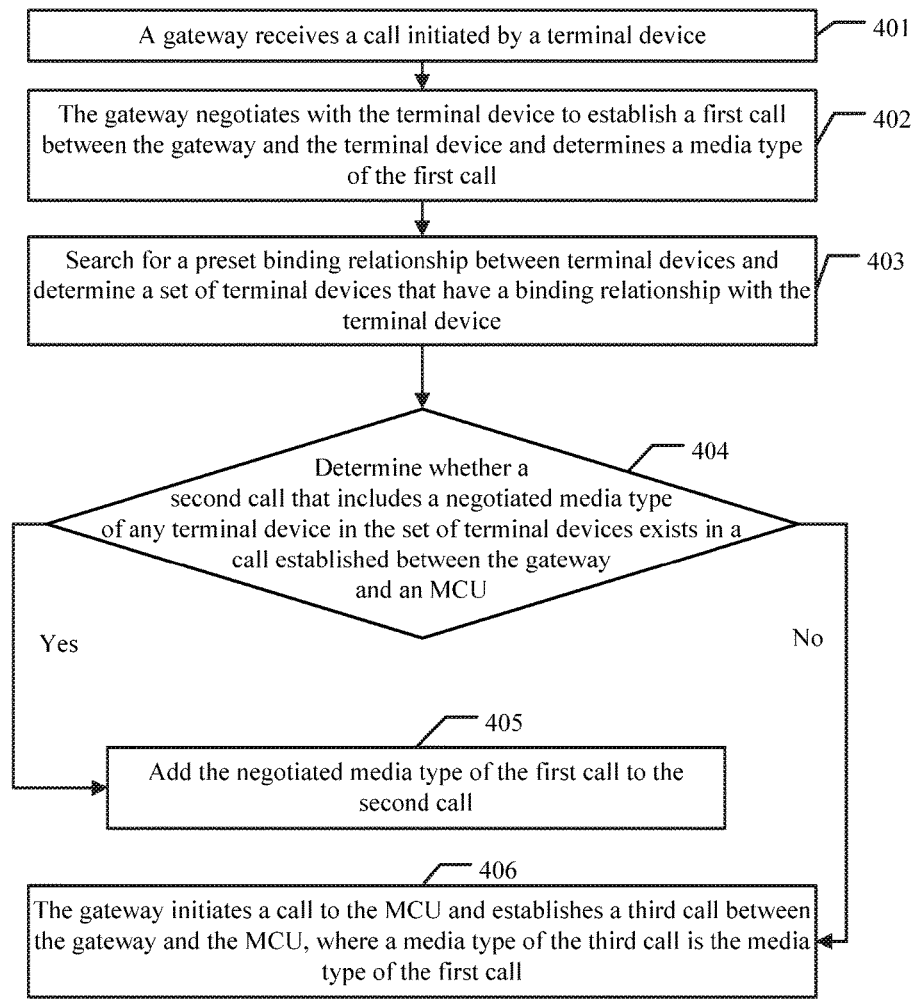
FIG. 4 is another schematic diagram of a call processing method according to an embodiment of the present disclosure.

For a better understanding of a technical solution in an embodiment of the present disclosure, refer to FIG. 4. FIG. 4 is an embodiment of a call processing method in the embodiment of the present disclosure, and the method includes the following steps.

401. A gateway receives a call initiated by a terminal device.

In this embodiment of the present disclosure, after a conference is held on an MCU, a user can initiate a call to the gateway using the terminal device, and the gateway receives the call initiated by the terminal device.

402. The gateway negotiates with the terminal device to establish a first call between the gateway and the terminal device and determines a media type of the first call.

In this embodiment of the present disclosure, after receiving the call initiated by the terminal device, the gateway negotiates with the terminal device, establishes the first call between the gateway and the terminal device and determines the media type of the first call, where the media type may be audio, video, auxiliary stream, or the like.

403. Search for a preset binding relationship between terminal devices and determine a set of terminal devices that have a binding relationship with the terminal device.

In this embodiment of the present disclosure, the preset binding relationship between terminal devices may be preset by a user. That is, the user establishes a binding relationship between multiple different terminal devices used by the user, and uploads the binding relationship to the gateway using a terminal device, such that the gateway can obtain the binding relationship, set by the user, between the multiple terminal devices used by the user. Alternatively, the user may further directly set a binding relationship between multiple different terminal devices on the gateway. For example, if terminal devices used by user 1 include A and B, user 1 sends a binding relationship between device A and device B to the gateway using device A, terminal devices used by user 2 include C, D, and E, and user 2 sends a binding relationship between devices C, D, and E to the gateway using device C, the gateway can process a call by directly using the received binding relationship between device A and device B and the received binding relationship between devices C, D, and E. Alternatively, user 1 directly sets, on the gateway, a binding relationship between device A and device B used by user 1, and user 2 directly sets, on the gateway, a binding relationship between terminal devices C, D, and E used by user 2.

In this embodiment of the present disclosure, the gateway searches for the preset binding relationship between the terminal devices and determines the set of terminal devices that have a binding relationship with the terminal device. For example, if the terminal device that initiates the call is device A, and a binding relationship that is obtained by means of searching and that is related to device A is binding relationships between devices A, B, C, D, and E, it can be determined that the set of terminal devices that have a binding relationship with device A include devices B, C, D, and E.

In this embodiment of the present disclosure, after obtaining the set of terminal devices that have a binding relationship with the terminal device that initiates the call, the gateway adds, according to the set of terminal devices, the negotiated media type of the first call to a call established between the gateway and the MCU. For details, refer to steps 404 and 405.

404. Determine whether a second call that includes a negotiated media type of any terminal device in the set of terminal devices exists in a call established between the gateway and an MCU. If the second call that includes a negotiated media type of any terminal device in the set of terminal devices exists in the call established between the gateway and the MCU, perform step 405. If the second call that includes a negotiated media type of any terminal device in the set of terminal devices does not exist in the call established between the gateway and the MCU, perform step 406.

In this embodiment of the present disclosure, the gateway determines whether the second call that includes a negotiated media type of any terminal device in the set of terminal devices exists in the call established between the gateway and the MCU. For example, if the terminal device that initiates the call is device A, and the set of terminal devices that have a binding relationship with device A include devices B, D, E, and F, the gateway determines whether a call that includes a negotiated media type of any terminal device of devices B, D, E, and F exists in the call established between the gateway and the MCU.

405. Add the negotiated media type of the first call to the second call.

406. The gateway initiates a call to the MCU and establishes a third call between the gateway and the MCU, where a media type of the third call is the media type of the first call.

In this embodiment of the present disclosure, if the second call that includes a negotiated media type of any terminal device in the set of terminal devices exists in the call established between the gateway and the MCU, the negotiated media type of the first call is added to the second call. If the second call that includes a negotiated media type of any terminal device in the set of terminal devices does not exist in the call established between the gateway and the MCU, the gateway initiates a call to the MCU and establishes the third call between the gateway and the MCU, where the media type of the third call is the media type of the first call.

It should be noted that, in this embodiment of the present disclosure, if a user hangs up a call between a terminal device used by the user and the gateway, the gateway searches the call established between the gateway and the MCU for a call that includes a negotiated media type of the terminal device, and deletes the negotiated media type of the terminal device from the call obtained by means of searching. If the call does not include a negotiated media type of another terminal device after the deletion, the gateway cancels the call. If the call includes a negotiated media type of another terminal device after the deletion, the gateway continues to hold the call.

In this embodiment of the present disclosure, after receiving a call initiated by a terminal device, a gateway negotiates with the terminal device to establish a first call between the gateway and the terminal device and determine a media type of the first call. The gateway searches for a preset binding relationship between terminal devices and determines a set of terminal devices that have a binding relationship with the terminal device. If a second call that includes a negotiated media type of any terminal device in the set of terminal devices exists in a call established between the gateway and an MCU, the gateway adds the negotiated media type of the first call to the second call. In this way, the negotiated media type of the call established between the terminal device and the gateway is added to the call established between the gateway and the MCU, which can efficiently solve a problem that multiple ports on the MCU are occupied when a user uses multiple terminal devices to join a video conference system, and can efficiently save port resources of the MCU. In addition, if the gateway processes a binding relationship sent by the terminal device to combine binding relationships of multiple users into one binding relationship, only one call needs to be established between the MCU and the gateway for the multiple users, which can also efficiently reduce a quantity of occupied ports on the MCU and save the port resources of the MCU.

For a better understanding of the technical solution in this embodiment of the present disclosure, the following describes an application scenario, which includes the following.

Conference 1 is held on MCU 1, and supported media types include audio, video, and auxiliary stream. User A calls conference 1 using a voice terminal public switched telephone network (PSTN)_A, and the call initiated by PSTN_A arrives at a gateway. It should be noted that, before initiating the call, user A may further send the gateway a binding relationship between terminal devices used by user A, where the binding relationship may be, for example, binding between PSTN_A and WEB_A. After receiving the call initiated by PSTN_A, the gateway negotiates with PSTN_A, establishes a first call between the gateway and PSTN_A and determines that a media type of the first call is an audio media type. Then the gateway can query the existing binding relationship to determine that a set of terminal devices that are bound to PSTN_A include WEB_A. If a second call used to negotiate an auxiliary stream media type of WEB_A is already established between the gateway and the MCU, the negotiated audio media type of the first call can be added to the second call, such that the audio media type of PSTN_A and the auxiliary stream media type of WEB_A can be negotiated in the second call. In this way, user A needs to occupy only one port on the MCU, which can efficiently reduce a quantity of occupied ports on the MCU and save port resources of the MCU.

Further, after receiving the binding relationship between PSTN_A and WEB_A that is sent by user A and receiving a binding relationship between PSTN_B and WEB_B that is sent by user B, the gateway may process the two binding relationships to combine the two binding relationships into one binding relationship, that is, a binding relationship among PSTN_A, PSTN_B, WEB_A, and WEB_B. After the gateway receives a call initiated by PSTN_A, establishes a first call between the gateway and PSTN_A, and determines that a media type of the first call is an audio media type, the gateway searches for the existing binding relationship to determine that a set of terminal devices that have a binding relationship with PSTN_A include PSTN_B, WEB_A, and WEB_B, and further determines whether a second call that includes a media type of any terminal device among PSTN_B, WEB_A, and WEB_B exists in a call established between the gateway and the MCU. If the call established between the gateway and the MCU includes the second call used by user B to negotiate an auxiliary stream media type of WEB_B, the gateway adds the negotiated audio media type of the first call to the second call. In addition, because media types of PSTN_A, PSTN_B, WEB_A, and WEB_B can be negotiated in the second call, for calls initiated by user A and user B, only one call needs to be established between the gateway and the MCU, which can efficiently reduce a quantity of occupied ports on the MCU and save port resources.

In this embodiment of the present disclosure, if user A hangs up the call initiated by PSTN_A, the gateway cancels the first call established between PSTN_A and the gateway, and searches for a call established between the gateway and the MCU. After determining that a call that includes the negotiated audio media type of PSTN_A is the second call, the gateway deletes the negotiated audio media type of PSTN_A from the second call, so as to update a negotiated media type in the second call. If the updated second call does not include a negotiated media type of any terminal device, the gateway cancels the second call between the gateway and the MCU. If the updated second call further includes the negotiated auxiliary stream media type of WEB_B, the gateway holds the second call.

Figure 5:
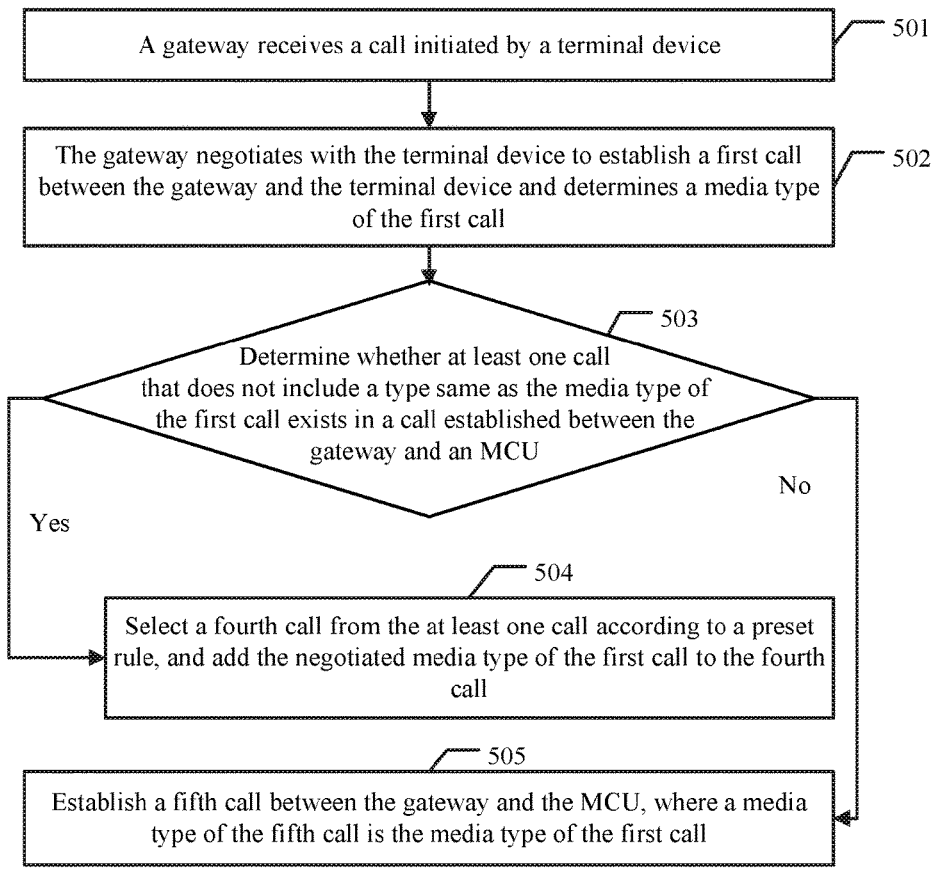
FIG. 5 is still another schematic diagram of a call processing method according to an embodiment of the present disclosure.

In this embodiment of the present disclosure, for a situation in which one user joins a video conference system using multiple terminal devices that support one media type, the following embodiment may be further used to achieve purposes of reducing a quantity of occupied ports on an MCU and saving port resources of the MCU. Referring to FIG. 5, FIG. 5 is an embodiment of a call processing method in the embodiment of the present disclosure, and the method includes the following steps.

501. A gateway receives a call initiated by a terminal device.

502. The gateway negotiates with the terminal device to establish a first call between the gateway and the terminal device and determines a media type of the first call.

In this embodiment of the present disclosure, step 501 and step 502 are similar to the content described in step 301 and step 302 in the embodiment shown in FIG. 3, and details are not described herein again.

503. Determine whether at least one call that does not include a media type same as the media type of the first call exists in a call established between the gateway and an MCU. If the at least one call that does not include the media type same as the media type of the first call exists in the call established between the gateway and the MCU, perform step 504. If the at least one call that does not include the media type same as the media type of the first call does not exist in the call established between the gateway and the MCU, perform step 505.

In this embodiment of the present disclosure, the gateway determines whether the at least one call that does not include the media type same as the media type of the first call exists in the call established between the gateway and the MCU. For example, if the media type of the terminal device that initiates the call is an audio media type, the gateway searches the call established between the gateway and the MCU to determine whether a call that does not include the negotiated audio media type exists.

504. Select a fourth call from the at least one call according to a preset rule, and add the negotiated media type of the first call to the fourth call.

505. Establish a fifth call between the gateway and the MCU, where a media type of the fifth call is the media type of the first call.

In this embodiment of the present disclosure, if the at least one call that does not include the media type same as the media type of the first call exists in the call established between the gateway and the MCU, the gateway selects the fourth call from the at least one call according to the preset rule, and adds the negotiated media type of the first call to the fourth call, where the preset rule may be selecting any call from the determined at least call, or may be selecting a call with a smallest quantity of negotiated media types, or the like. In an actual application, a rule for selecting the fourth call from the determined at least one call can be set according to a specific situation, and no limitation is set herein.

In this embodiment of the present disclosure, if a call that does not include the media type same as the media type of the first call does not exist in the call established between the gateway and the MCU, the gateway establishes the fifth call between the gateway and the MCU, where the media type of the fifth call is the media type of the first call.

It should be noted that, in this embodiment of the present disclosure, if a user hangs up a call between a terminal device used by the user and the gateway, the gateway searches the call established between the gateway and the MCU for a call that includes a negotiated media type of the terminal device, and deletes the negotiated media type of the terminal device from the call obtained by means of searching. If the call does not include a negotiated media type of another terminal device after the deletion, the gateway cancels the call. If the call includes a negotiated media type of another terminal device after the deletion, the gateway continues to hold the call.

In this embodiment of the present disclosure, after receiving a call initiated by a terminal device, negotiating with the terminal device to establish a first call between a gateway and the terminal device and determine a media type of the first call, the gateway determines whether at least one call that does not include a media type same as the media type of the first call exists in a call established between the gateway and an MCU. If the at least one call that does not include the media type same as the media type of the first call exists in the call established between the gateway and the MCU, the gateway selects a fourth call from the at least one call according to a preset rule, and adds the negotiated media type of the first call to the fourth call, such that different media types of multiple different terminal devices can be negotiated in each call established between the gateway and the MCU, which can efficiently reduce a quantity of occupied ports on the MCU and save port resources of the MCU.

For a better understanding of the technical solution in this embodiment of the present disclosure, the following describes an application scenario.

Conference 1 is held on MCU 1, and supported media types include audio, video, and auxiliary stream. User A calls conference 1 using PSTN_A, and the call initiated by PSTN_A arrives at a gateway. After receiving the call initiated by PSTN_A, the gateway negotiates with PSTN_A, establishes a first call between the gateway and PSTN_A and determines that a media type of the first call is an audio media type. Then the gateway determines whether at least one call that does not include the negotiated audio media type exists in a call established between the gateway and an MCU. If the at least one call that does not include the negotiated audio media type exists in the call established between the gateway and the MCU, the gateway selects a fourth call from the at least one call according to a preset rule, and adds the negotiated audio media type of the first call to the fourth call. If the at least one call that does not include the negotiated audio media type does not exist in the call established between the gateway and the MCU, the gateway establishes a fifth call between the gateway and the MCU, where a media type of the fifth call is the audio media type of the first call.

In this embodiment of the present disclosure, if user A hangs up the call initiated by PSTN_A, the gateway cancels the first call established between PSTN_A and the gateway, and searches the call established between the gateway and the MCU. After determining that a call that includes the negotiated audio media type of PSTN_A is the fourth call, the gateway deletes the negotiated audio media type of PSTN_A from the fourth call, so as to update a negotiated media type of the fourth call. If the updated fourth call does not include a negotiated media type of any terminal device, the gateway cancels the fourth call between the gateway and the MCU. If the updated fourth call further includes a negotiated auxiliary stream media type of WEB_B, the gateway holds the fourth call.

It should be noted that "first", "second", "third", "fourth", and "fifth" mentioned in the first call, the second call, the third call, the fourth call, and the fifth call in the embodiments shown in FIG. 3 to FIG. 5 are merely used to differentiate different calls and do not cause a limitation to the calls.

Figure 6:
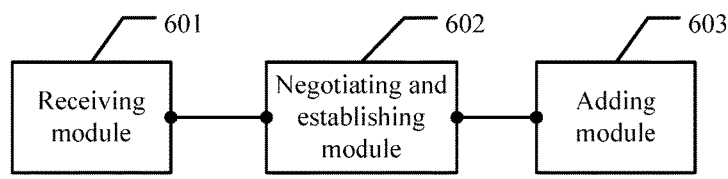
FIG. 6 is a schematic structural diagram of a gateway according to an embodiment of the present disclosure.

Referring to FIG. 6, FIG. 6 is an embodiment of a structure of a gateway in the embodiment of the present disclosure, and the gateway includes a receiving module 601 configured to receive a call initiated by a terminal device; a negotiating and establishing module 602 configured to, after the receiving module 601 receives the call, negotiate with the terminal device to establish a first call between the gateway and the terminal device and determine a media type of the first call; and an adding module 603 configured to, after the negotiating and establishing module 602 establishes the first call and determines the media type of the first call, add the negotiated media type of the first call to a call established between the gateway and an MCU, where the media type of the first call is different from that of the established call.

In this embodiment of the present disclosure, the receiving module 601 of the gateway receives the call initiated by the terminal device, and then the negotiating and establishing module 602 negotiates with the terminal device, establishes the first call between the gateway and the terminal device and determines the media type of the first call, and finally the adding module 603 adds the negotiated media type of the first call to the call established between the gateway and the MCU.

In this embodiment of the present disclosure, after receiving a call initiated by a terminal device, a gateway may negotiate with the terminal device to establish a first call between the gateway and the terminal device and determine a media type of the first call, and add the negotiated media type of the first call to a call established between the gateway and an MCU, such that multiple calls between the gateway and the terminal device can be combined into one call between the gateway and the MCU, which efficiently reduces a quantity of used ports on the MCU and saves port resources of the MCU.

Figure 7:
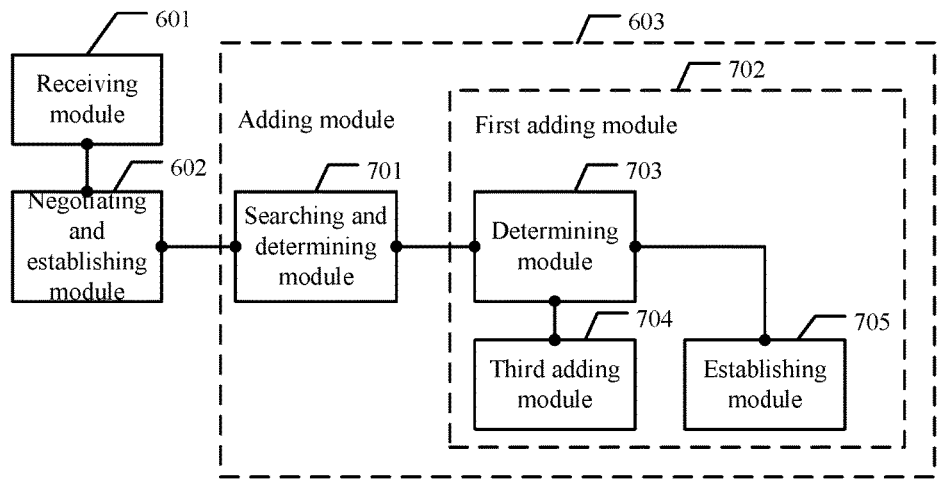
FIG. 7 is another schematic structural diagram of a gateway according to an embodiment of the present disclosure.

For a better understanding of a gateway in an embodiment of the present disclosure, refer to FIG. 7. FIG. 7 is an embodiment of a structure of a gateway in the embodiment of the present disclosure, and the gateway includes the receiving module 601, the negotiating and establishing module 602, and the adding module 603 described in the embodiment shown in FIG. 6. Descriptions about these modules are similar to the content described in the embodiment shown in FIG. 6, and details are not described herein again.

In this embodiment of the present disclosure, the adding module 603 includes a searching and determining module 701 configured to, after the negotiating and establishing module 602 establishes a first call and determines a media type of the first call, searches for a preset binding relationship between terminal devices and determines a set of terminal devices that have a binding relationship with a terminal device; and a first adding module 702 configured to, after the searching and determining module 701 determines the set of terminal devices, adds, according to the set of terminal devices, the negotiated media type of the first call to a call established between the gateway and an MCU.

In this embodiment of the present disclosure, the first adding module 702 includes a determining module 703 configured to determine whether a second call that includes a negotiated media type of any terminal device in the set of terminal devices exists in the call established between the gateway and the MCU; and a third adding module 704 configured to, after the determining module 703 determines that the second call that includes a negotiated media type of any terminal device in the set of terminal devices exists in the call established between the gateway and the MCU, adds the negotiated media type of the first call to the second call.

In addition, in this embodiment of the present disclosure, the first adding module 702 further includes an establishing module 705 configured to, if the second call that includes a negotiated media type of any terminal device in the set of terminal devices does not exist in the call established between the gateway and the MCU, initiate a call to the MCU and establish a third call between the gateway and the MCU, where a media type of the third call is the media type of the first call.

In this embodiment of the present disclosure, the gateway includes the preset binding relationship between terminal devices, and the binding relationship may be preset by a user. That is, the user establishes a binding relationship between multiple different terminal devices used by the user, and uploads the binding relationship to the gateway using a terminal device, such that the gateway can obtain the binding relationship, set by the user, between the multiple terminal devices used by the user. After receiving the binding relationship that is sent by the user using the terminal device, the gateway can process a call using the binding relationship. Alternatively, the user may further directly set a binding relationship between multiple different terminal devices on the gateway. For example, if terminal devices used by user 1 include devices A and B, user 1 sends a binding relationship between device A and device B to the gateway using device A, terminal devices used by user 2 include devices C, D, and E, and user 2 sends a binding relationship between devices C, D, and E to the gateway using device C, the gateway can process a call by directly using the received binding relationship between device A and device B and the received binding relationship between devices C, D, and E. Alternatively, user 1 directly sets, on the gateway, a binding relationship between device A and device B used by user 1, and user 2 directly sets, on the gateway, a binding relationship between terminal devices C, D, and E used by user 2.

In this embodiment of the present disclosure, the receiving module 601 of the gateway receives a call initiated by the terminal device, and then the negotiating and establishing module 602 negotiates with the terminal device, establishes the first call between the gateway and the terminal device and determines the media type of the first call, and the searching and determining module 701 in the adding module 603 searches for the preset binding relationship between terminal devices and determines the set of terminal devices that have a binding relationship with the terminal device. The first adding module 702 in the adding module 603 adds, according to the set of terminal devices, the negotiated media type of the first call to the call established between the gateway and the MCU. More specifically, the determining module 703 in the first adding module 702 determines whether the second call that includes a negotiated media type of any terminal device in the set of terminal devices exists in the call established between the gateway and the MCU. After the determining module 703 determines that the second call that includes a negotiated media type of any terminal device in the set of terminal devices exists in the call established between the gateway and the MCU, the third adding module 704 in the first adding module 702 adds the negotiated media type of the first call to the second call. If the determining module 703 determines that the second call that includes a negotiated media type of any terminal device in the set of terminal devices does not exist in the call established between the gateway and the MCU, the establishing module 705 initiates a call to the MCU and establishes the third call between the gateway and the MCU, where the media type of the third call is the media type of the first call.

In this embodiment of the present disclosure, after receiving a call initiated by a terminal device, a gateway negotiates with the terminal device to establish a first call between the gateway and the terminal device and determines a media type of the first call. The gateway searches for a preset binding relationship between terminal devices and determines a set of terminal devices that have a binding relationship with the terminal device. If a second call that includes a negotiated media type of any terminal device in the set of terminal devices exists in a call established between the gateway and an MCU, the gateway adds the negotiated media type of the first call to the second call. In this way, the negotiated media type of the call established between the terminal device and the gateway is added to the call established between the gateway and the MCU, which can efficiently solve a problem that multiple ports on the MCU are occupied when a user uses multiple terminal devices to join a video conference system, and can efficiently save port resources of the MCU. In addition, if the gateway processes a binding relationship sent by the terminal device to combine binding relationships of multiple users into one binding relationship, only one call needs to be established between the MCU and the gateway for the multiple users, which can also efficiently reduce a quantity of occupied ports on the MCU and save the port resources of the MCU.

Figure 8:
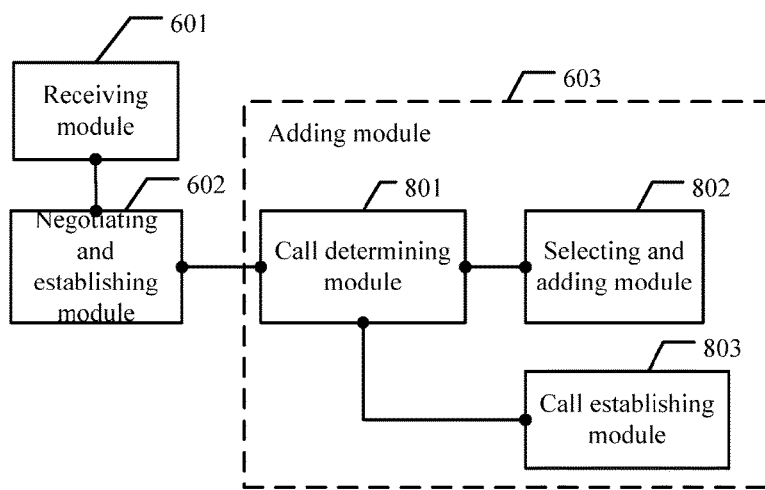
FIG. 8 is still another schematic structural diagram of a gateway according to an embodiment of the present disclosure.

Referring to FIG. 8, FIG. 8 is another embodiment of a structure of a gateway in the embodiment of the present disclosure, and the gateway includes the receiving module 601, the negotiating and establishing module 602, and adding module 603 described in the embodiment shown in FIG. 6. Descriptions about these modules are similar to the content described in the embodiment shown in FIG. 6, and details are not described herein again.

In this embodiment of the present disclosure, the adding module 603 includes a call determining module 801 configured to, after the negotiating and establishing module 602 establishes a first call and determines a media type of the first call, determines whether at least one call that does not include a media type same as the media type of the first call exists in a call established between the gateway and an MCU; and a selecting and adding module 802 configured to, when the call determining module 801 determines that the at least one call that does not include the media type same as the media type of the first call exists in the call established between the gateway and the MCU, select a fourth call from the at least one call according to a preset rule, and add the negotiated media type of the first call to the fourth call.

In this embodiment of the present disclosure, the adding module 603 further includes a call establishing module 803 configured to, if a call that does not include the media type same as the media type of the first call does not exist in the call established between the gateway and the MCU, establish a fifth call between the gateway and the MCU, where a media type of the fifth call is the media type of the first call.

In this embodiment of the present disclosure, the receiving module 601 of the gateway receives a call initiated by a terminal device, and then the negotiating and establishing module 602 negotiates with the terminal device to establish the first call between the gateway and the terminal device and determines the media type of the first call, and then the call determining module 801 in the adding module 603 determines whether the at least one call that does not include the media type same as the media type of the first call exists in the call established between the gateway and the MCU. When the call determining module 801 determines that the at least one call that does not include the media type same as the media type of the first call exists in the call established between the gateway and the MCU, the selecting and adding module 802 selects the fourth call from the at least one call according to the preset rule, and adds the negotiated media type of the first call to the fourth call. If a call that does not include the media type same as the media type of the first call does not exist in the call established between the gateway and the MCU, the call establishing module 803 establishes the fifth call between the gateway and the MCU, where the media type of the fifth call is the media type of the first call.

In this embodiment of the present disclosure, after receiving a call initiated by a terminal device, negotiating with the terminal device to establish a first call between a gateway and the terminal device and determine a media type of the first call, the gateway determines whether at least one call that does not include a media type same as the media type of the first call exists in a call established between the gateway and an MCU. If the at least one call that does not include the media type same as the media type of the first call exists in the call established between the gateway and the MCU, the gateway selects a fourth call from the at least one call according to a preset rule, and adds the negotiated media type of the first call to the fourth call, such that different media types of multiple different terminal devices can be negotiated in each call established between the gateway and the MCU, which can efficiently reduce a quantity of occupied ports on the MCU and save port resources of the MCU.

Figure 9:
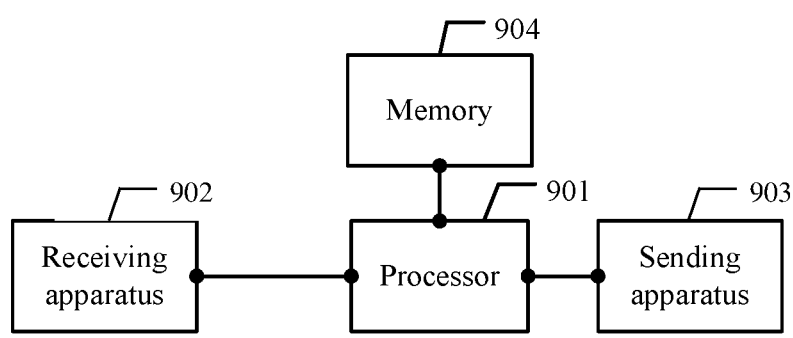
FIG. 9 is a schematic structural diagram of hardware of a gateway according to an embodiment of the present disclosure.

Referring to FIG. 9, FIG. 9 is a schematic structural diagram of hardware of a gateway according to an embodiment of the present disclosure, and the gateway includes a processor 901, a receiving apparatus 902, a sending apparatus 903, and a storage memory 904.

The receiving apparatus 902 receives a call initiated by a terminal device.

After the receiving apparatus 902 receives the call initiated by the terminal device, the processor 901 negotiates with the terminal device to establish a first call between the gateway and the terminal device and determine a media type of the first call and adds the negotiated media type of the first call to a call established between the gateway and an MCU.

In this embodiment of the present disclosure, after receiving a call initiated by a terminal device, a gateway may negotiate with the terminal device to establish a first call between the gateway and the terminal device and determine a media type of the first call, and add the negotiated media type of the first call to a call established between the gateway and an MCU, such that multiple calls between the gateway and the terminal device can be combined into one call between the gateway and MCU, which efficiently reduces a quantity of used ports on the MCU and saves port resources of the MCU.

A person of ordinary skill in the art may understand that all or some of the steps of the methods in the embodiments may be implemented by a program instructing relevant hardware. The program may be stored in a computer readable storage medium. The storage medium may include a read-only memory, a magnetic disk, or an optical disc.

The foregoing describes a call processing method and a gateway provided in the present disclosure. A person of ordinary skill in the art may, based on the idea of the present disclosure, make modifications with respect to the implementation manners and the application scope. Therefore, the content of this specification shall not be construed as a limitation to the present disclosure.

What is claimed is:

1. A call processing method, comprising:
    receiving, by a gateway, a preset binding relationship from a user, the preset binding relationship identifying a plurality of terminal devices;
    storing, by the gateway, the preset binding relationship in a memory of the gateway;
    receiving, by the gateway, a call initiated by a terminal device;
    negotiating, by the gateway, with the terminal device, to establish a first call between the gateway and the terminal device and determine a media type of the first call; and
    adding the negotiated media type of the first call to a call established between the gateway and a multipoint control unit (MCU) by:
        searching for the preset binding relationship in the memory of the gateway;
        determining, according to the preset binding relationship, whether the terminal device has a binding relationship with a second terminal device that is associated with the call established between the gateway and the MCU;
        adding the negotiated media type of the first call to the call established between the gateway and the MCU when the terminal device and the second terminal device have the binding relationship; and
        establishing a second call between the gateway and the MCU for the terminal device when the terminal device and the second terminal device do not have the binding relationship.

2. The call processing method of claim 1, wherein adding the negotiated media type of the first call to the call established between the gateway and the MCU comprises:
    determining whether a third call that comprises a negotiated media type of any terminal device in the preset binding relationship exists in the call established between the gateway and the MCU; and
    adding the negotiated media type of the first call to the third call when the third call that comprises the negotiated media type of any terminal device in the preset binding relationship exists in the call established between the gateway and the MCU.

3. The call processing method of claim 2, wherein adding the negotiated media type of the first call to the call established between the gateway and the MCU comprises initiating, by the gateway, a call to the MCU and establishing a fourth call between the gateway and the MCU when the third call that comprises the negotiated media type of any terminal device in the preset binding relationship does not exist in the call established between the gateway and the MCU, and a media type of the fourth call is the media type of the first call.

4. The call processing method of claim 1, wherein adding the negotiated media type of the first call to the call established between the gateway and the MCU comprises:
    determining whether at least one call that does not comprise a media type a same as the media type of the first call exists in the call established between the gateway and the MCU; and
    selecting a third call from the at least one call according to a preset rule, and adding the negotiated media type of the first call to the third call, when the at least one call that does not comprise the media type the same as the media type of the first call exists in the call established between the gateway and the MCU.

5. The call processing method of claim 4, wherein the method further comprises establishing a fourth call between the gateway and the MCU when a call that does not comprise the media type a same as the media type of the first call does not exist in the call established between the gateway and the MCU, and a media type of the fourth call is the media type of the first call.

6. The call processing method of claim 1, wherein the media type of the first call is different from that of the established call.

7. The call processing method of claim 6, wherein the media type of the first call comprises an audio type, a video type, or a data type.

8. The call processing method of claim 1, wherein the preset binding relationship from the user comprises that the plurality of terminal devices are selected by the user and are uploaded to the gateway by the terminal device.

9. A non-transitory computer readable medium containing computer-executable instructions, the computer-executable instructions, when executed by a processor of a gateway, cause the gateway to perform operations comprising:
  receiving a preset binding relationship from a user, the preset binding relationship identifying a plurality of terminal devices;
  storing the preset binding relationship in a memory of the gateway;
  receiving a call initiated by a terminal device;
  negotiating with the terminal device to establish a first call between the gateway and the terminal device and determine a media type of the first call; and
  adding the negotiated media type of the first call to a call established between the gateway and a multipoint control unit (MCU) by:
    searching for the preset binding relationship in the memory of the gateway;
    determining, according to the preset binding relationship, whether the terminal device has a binding relationship with a second terminal device that is associated with the call established between the gateway and the MCU;
    adding the negotiated media type of the first call to the call established between the gateway and the MCU when the terminal device and the second terminal device have the binding relationship; and
    establishing a second call between the gateway and the MCU for the terminal device when the terminal device and the second terminal device do not have the binding relationship.

10. The non-transitory computer readable medium of claim 9, wherein the operation of adding the negotiated media type of the first call to the call established between the gateway and the MCU comprises:
  determining whether a third call that comprises a negotiated media type of any terminal device in the preset binding relationship exists in the call established between the gateway and the MCU; and
  adding the negotiated media type of the first call to the third call when the third call that comprises the negotiated media type of any terminal device in the preset binding relationship exists in the call established between the gateway and the MCU.

11. The non-transitory computer readable medium of claim 10, wherein the operation of adding the negotiated media type of the first call to the call established between the gateway and the MCU comprises initiating a call to the MCU and establishing a fourth call between the gateway and the MCU when the third call that comprises the negotiated media type of any terminal device in the preset binding relationship does not exist in the call established between the gateway and the MCU, and a media type of the fourth call is the media type of the first call.

12. The non-transitory computer readable medium of claim 9, wherein the operation of adding the negotiated media type of the first call to the call established between the gateway and the MCU comprises:
  determining whether at least one call that does not comprise a media type a same as the media type of the first call exists in the call established between the gateway and the MCU; and
  selecting a third call from the at least one call according to a preset rule, and adding the negotiated media type of the first call to the third call when the at least one call that does not comprise the media type the same as the media type of the first call exists in the call established between the gateway and the MCU.

13. The non-transitory computer readable medium of claim 12, wherein the operations further comprise establishing a fourth call between the gateway and the MCU when a call that does not comprise the media type a same as the media type of the first call does not exist in the call established between the gateway and the MCU, and a media type of the fourth call is the media type of the first call.

14. The non-transitory computer readable medium of claim 9, wherein the media type of the first call is different from that of the established call, the media type of the first call comprises an audio type, a video type, or a data type, and the preset binding relationship from the user comprises that the plurality of terminal devices are selected by the user and are uploaded to the gateway by the terminal device.

15. A gateway comprising:
  a non-transitory computer readable medium which contains computer-executable instructions; and
  a processor coupled to the non-transitory computer readable medium and configured to execute the computer-executable instructions to perform operations comprising:
    receiving a preset binding relationship from a user, the preset binding relationship identifying a plurality of terminal devices;
    storing the preset binding relationship in a memory of the gateway;
    receiving a call initiated by a terminal device;
    negotiating with the terminal device to establish a first call between the gateway and the terminal device and determine a media type of the first call; and
    adding the negotiated media type of the first call to a call established between the gateway and a multipoint control unit (MCU) by:
      searching for the preset binding relationship in the memory of the gateway;
      determining, according to the preset binding relationship, whether the terminal device has a binding relationship with a second terminal device that is associated with the call established between the gateway and the MCU;
      adding the negotiated media type of the first call to the call established between the gateway and the MCU when the terminal device and the second terminal device have the binding relationship; and
      establishing a second call between the gateway and the MCU for the terminal device when the terminal device and the second terminal device do not have the binding relationship.

16. The gateway of claim 15, wherein the operation of adding the negotiated media type of the first call to the call established between the gateway and the MCU comprises:
  determining whether a third call that comprises a negotiated media type of any terminal device in the preset binding relationship exists in the call established between the gateway and the MCU; and adding the negotiated media type of the first call to the third call when the third call that comprises the negotiated media type of any terminal device in the preset binding relationship exists in the call established between the gateway and the MCU.

17. The gateway of claim 16, wherein the operation of adding the negotiated media type of the first call to the call established between the gateway and the MCU comprises initiating a call to the MCU and establishing a fourth call between the gateway and the MCU when the third call that comprises the negotiated media type of any terminal device in the preset binding relationship does not exist in the call established between the gateway and the MCU, and a media type of the fourth call is the media type of the first call.

18. The gateway of claim 15, wherein the operation of adding the negotiated media type of the first call to the call established between the gateway and the MCU comprises:
  determining whether at least one call that does not comprise a media type a same as the media type of the first call exists in the call established between the gateway and the MCU; and selecting a third call from the at least one call according to a preset rule, and adding the negotiated media type of the first call to the third call when the at least one call that does not comprise the media type the same as the media type of the first call exists in the call established between the gateway and the MCU.

19. The gateway of claim 18, wherein the operations further comprise establishing a fourth call between the gateway and the MCU when a call that does not comprise the media type a same as the media type of the first call does not exist in the call established between the gateway and the MCU, and a media type of the fourth call is the media type of the first call.

20. The gateway of claim 15, wherein the media type of the first call is different from that of the established call, the media type of the first call comprises an audio type, a video type, or a data type, and the preset binding relationship from the user comprises that the plurality of terminal devices are selected by the user and are uploaded to the gateway by the terminal device.

* * * * *